(12) United States Patent
Reich et al.

(10) Patent No.: US 9,369,341 B2
(45) Date of Patent: *Jun. 14, 2016

(54) STATIC RING NETWORK FOR VEHICLE COMMUNICATIONS

(71) Applicant: Orbit Communications Systems Ltd., Netanya (IL)

(72) Inventors: Ofer Reich, Kadima (IL); Eran Hashin, Hod Hasharon (IL); Erez Shabirow, Tel Aviv (IL); Eitan Shabbat, Tel Aviv (IL)

(73) Assignee: ORBIT COMMUNICATION SYSTEMS LTD., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,810

(22) Filed: Jun. 8, 2015

(65) Prior Publication Data

US 2015/0271019 A1 Sep. 24, 2015

Related U.S. Application Data

(63) Continuation-in-part of application No. 13/470,367, filed on May 14, 2012, now Pat. No. 9,077,641.

(60) Provisional application No. 61/486,295, filed on May 15, 2011.

(51) Int. Cl.

| | |
|---|---|
| *G06F 15/177* | (2006.01) |
| *H04L 12/24* | (2006.01) |
| *H04L 29/08* | (2006.01) |
| *H04L 12/437* | (2006.01) |
| *H04L 12/46* | (2006.01) |
| *H04L 12/413* | (2006.01) |
| *H04L 12/40* | (2006.01) |

(52) U.S. Cl.
CPC .......... *H04L 41/0816* (2013.01); *H04L 12/413* (2013.01); *H04L 12/437* (2013.01); *H04L 12/4637* (2013.01); *H04L 41/145* (2013.01); *H04L 67/12* (2013.01); *H04L 2012/4028* (2013.01)

(58) Field of Classification Search
CPC . H04L 12/437; H04L 41/145; H04L 12/4637; H04L 47/13
USPC .................................. 709/200, 220, 223, 251
See application file for complete search history.

(56) References Cited

U.S. PATENT DOCUMENTS

| | | | | | |
|---|---|---|---|---|---|
| 5,706,278 | A | * | 1/1998 | Robillard | .......... H04L 12/40156 370/222 |
| 6,034,961 | A | * | 3/2000 | Masuo | ............... H04Q 11/0478 370/219 |
| 6,216,166 | B1 | * | 4/2001 | Zheng | ............... H04L 29/12254 370/401 |
| 6,314,110 | B1 | * | 11/2001 | Chin | ....................... H04L 47/13 370/358 |
| 6,356,809 | B1 | * | 3/2002 | Morrison | ............ G01F 23/0069 700/22 |
| 2003/0048754 | A1 | * | 3/2003 | Bruckman | .......... H04L 12/2697 370/252 |

(Continued)

*Primary Examiner* — Anthony Mejia
(74) *Attorney, Agent, or Firm* — Mark M. Friedman

(57) ABSTRACT

A method for operating a ring network includes the steps of configuring the ring network with static configuration information and then deterministically exchanging operational data between a plurality of nodes on the ring network, while operating the ring network in accordance with the static configuration information. This system facilitates communications that meet the high reliability and performance requirements of vehicle communications, in particular in aircraft data networks (ADNs), while reducing the cost, weight and complexity of conventional implementations.

19 Claims, 7 Drawing Sheets

(56) References Cited

U.S. PATENT DOCUMENTS

| | | | | |
|---|---|---|---|---|
| 2003/0086368 A1* | 5/2003 | Limaye | H04J 3/085 | 370/216 |
| 2004/0130442 A1* | 7/2004 | Breed | B60C 11/24 | 340/443 |
| 2006/0050665 A1* | 3/2006 | Bruckman | H04L 12/42 | 370/329 |
| 2007/0153514 A1* | 7/2007 | Dowling | H05B 33/0842 | 362/231 |
| 2007/0230368 A1* | 10/2007 | Shi | H04L 12/42 | 370/254 |
| 2007/0237150 A1* | 10/2007 | Wood | H04L 45/04 | 370/392 |
| 2007/0274207 A1* | 11/2007 | Li | H04L 12/437 | 370/222 |
| 2007/0280251 A1* | 12/2007 | Wang | H04L 12/437 | 370/395.1 |
| 2008/0008202 A1* | 1/2008 | Terrell | H04L 12/5693 | 370/401 |
| 2008/0080367 A1* | 4/2008 | Fujii | H04L 45/28 | 370/223 |
| 2008/0112400 A1* | 5/2008 | Dunbar | H04L 12/2697 | 370/360 |
| 2008/0114502 A1* | 5/2008 | Breed | B60C 11/24 | 701/2 |
| 2008/0144526 A1* | 6/2008 | Hall | H04J 3/0652 | 370/254 |
| 2008/0288646 A1* | 11/2008 | Hasha | H04L 67/1095 | 709/228 |
| 2008/0317466 A1* | 12/2008 | Chung | H04J 14/0204 | 398/59 |
| 2009/0074413 A1* | 3/2009 | Bannai | H04L 12/42 | 398/59 |
| 2010/0020798 A1* | 1/2010 | Jones | H04L 12/413 | 370/392 |
| 2010/0172242 A1* | 7/2010 | Prashker | H04L 12/427 | 370/235 |
| 2011/0158646 A1* | 6/2011 | Yuang | H04J 14/0283 | 398/48 |
| 2012/0269053 A1* | 10/2012 | Yu | H04L 12/4641 | 370/216 |
| 2012/0290692 A1* | 11/2012 | Reich | H04L 12/437 | 709/220 |

* cited by examiner

STATIC RING NETWORK FOR VEHICLE COMMUNICATIONS

CROSS-REFERENCE TO RELATED APPLICATIONS

This application claims the benefit of provisional patent application (PPA) Ser. No. 61/486,295, filed May 15, 2011 by the present inventors, which is incorporated by reference.

FIELD OF THE INVENTION

The present invention generally relates to communications, and in particular, it concerns communications in vehicles.

BACKGROUND OF THE INVENTION

Aircraft data networks (ADNs) include the specification of data networking standards for use in aircraft installations and implementations thereof. The standards provide a means to adapt commercial networking standards and products (typically referred to as "commercial off the shelf" or COTS) to an aircraft environment. ADNs typically require higher reliability and specific performance requirements, as compared to commercial networks.

Current ADNs include the use of multiple redundant devices, wiring, and complex networking protocols increasing the cost, weight, and complexity of current ADNs. There is therefore a need for a system and method of communications that meets the high reliability and performance requirements of vehicle communications, while reducing the cost, weight, and complexity of conventional implementations.

SUMMARY

According to the teachings of the present embodiment there is provided a method including the steps of: configuring a ring network with static configuration information, and operational data deterministically between a plurality of nodes on the ring network while operating the ring network in accordance with the static configuration information, wherein exchanging operational data deterministically includes guaranteeing a bandwidth, a latency, and jitter of each logical communication channel with traffic flow control, wherein at least a portion of the static configuration information is for guaranteeing quality of service (QoS) on the ring network, and wherein at least a portion of the static configuration information is stored on each of the nodes, and wherein at least one of the nodes is configured to terminate the exchange of a portion of the operational data received from a first direction if the node previously received the portion from an other direction.

According to the teachings of the present embodiment there is provided a system including: a static deterministic ring network including a plurality of devices operationally connected in a ring topology, wherein operational data is exchanged between the devices while operating the static deterministic ring network deterministically in accordance with static configuration information, wherein operating deterministically includes guaranteeing a bandwidth, a latency, and jitter of each logical communication channel with traffic flow control, wherein at least a portion of the static configuration information is for guaranteeing quality of service (QoS) on the ring network, and wherein at least a portion of the static configuration information is stored on each of the devices, and wherein at least one of the devices is further configured to terminate the exchange of a portion of the operational data received from a first direction if the device previously received the portion from an other direction.

According to the teachings of the present embodiment there is provided a method for operating a ring network including the steps of: configuring the ring network with static configuration information; and exchanging operational data deterministically between a plurality of nodes on the ring network while operating the ring network in accordance with the static configuration information.

In an optional embodiment, the method further includes the step of generating the static configuration information by simulating offline the networking requirements of the ring network. In another optional embodiment, exchanging operational data includes transmitting simultaneously the operational data between the nodes in two opposite directions. In another optional embodiment, operating the ring network includes each of the nodes using the static configuration information to limit operation of one or more services running on the nodes.

In another optional embodiment, limiting operation of one or more services includes a limitation selected from the group consisting of: bandwidth available to the services; and quality of service (QoS) for the services.

In another optional embodiment, at least a portion of the static configuration information is for guaranteeing quality of service (QoS) on the ring network. In another optional embodiment, exchanging operational data is terminated at or before the operational data is received by one of the nodes that originated the operational data. In another optional embodiment, exchanging operational data is terminated by one of the nodes if the operational data is associated with that node's address on the ring network.

In another optional embodiment, operation of the ring network is in accordance with Federal Aviation Administration (FAA) regulations. In another optional embodiment, the static configuration information includes operating parameters for each of the nodes. In another optional embodiment, at least a portion of the static configuration information is stored on each of the nodes. In another optional embodiment, each of the nodes is configured to inhibit changes to the static configuration information while operating the ring network.

According to the teachings of the present embodiment there is provided a system including a static deterministic ring network including a plurality of nodes operationally connected in a ring topology, wherein operational data is exchanged between the nodes while operating the static deterministic ring network deterministically in accordance with static configuration information.

In an optional embodiment, the static configuration information includes operating parameters for each of the nodes. In another optional embodiment, at least a portion of the static configuration information is stored on each of the nodes. In another optional embodiment, each of the nodes is configured to inhibit changes to fixe static configuration information while op rating the ring network.

In another optional embodiment, the system further includes one or more configuration tables for storing the static configuration information. In another optional embodiment, each the node includes a configuration table defining the static configuration information for each the node. In another optional embodiment, the static configuration information includes a description of a path for the operational data to be exchanged between the nodes.

In an optional embodiment, a vehicle includes the static deterministic ring network. In another optional embodiment, the vehicle is an airplane.

In an optional embodiment, the static deterministic ring network includes two rings for simultaneous transmission of the operational data between the nodes in two opposite directions. In another optional embodiment, each of the nodes uses the static configuration information to limit operation of one or more services running on the nodes. In another optional embodiment, exchange of the operational data is terminated at or before the operational data is received by one of the nodes that originated the operational data. In another optional embodiment, exchange of the operational data is terminated by one of the nodes if the operational data is associated with that node's address on the ring network.

BRIEF DESCRIPTION OF FIGURES

The embodiment is herein described, by way of example only, with reference to the accompanying drawings, wherein.

DETAILED DESCRIPTION

Main Embodiment—FIGS. 1-4, 10

Figure 1:
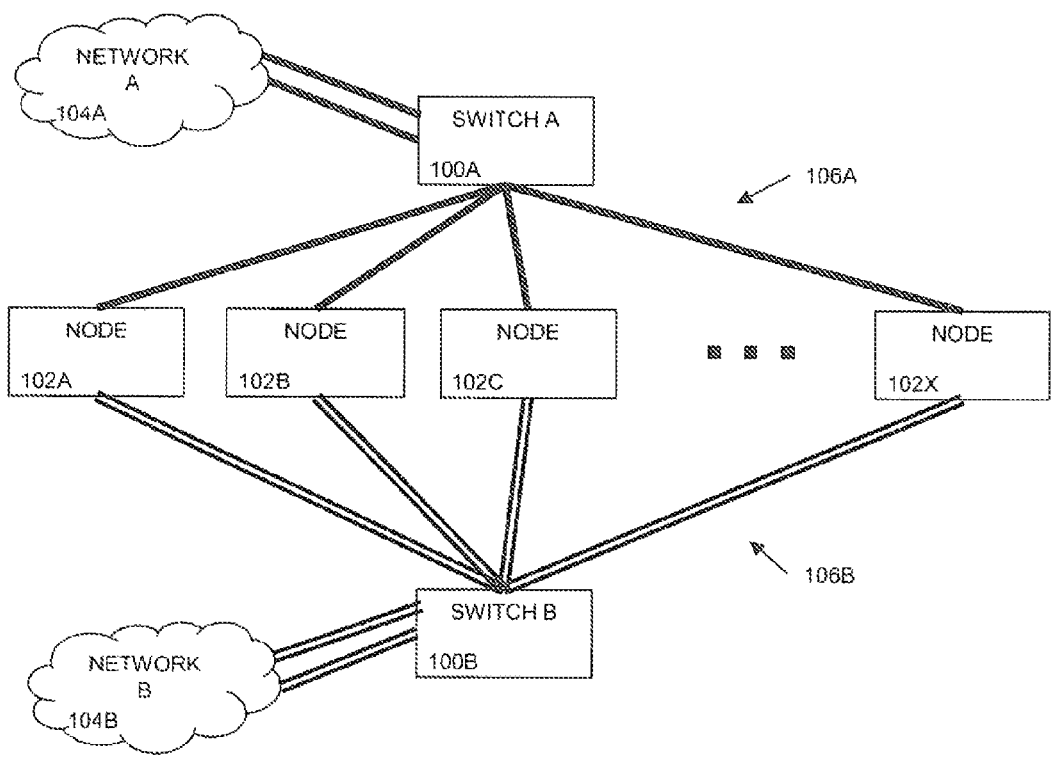
FIG. 1, a diagram of a conventional ADN star topology network.

The principles and operation of the system according to a present embodiment may be better understood with reference to the drawings and the accompanying description. A present invention is a system for vehicle communications. The system facilitates communications that meet the high reliability and performance requirements of vehicle communications, while reducing the cost, weight, and complexity of conventional implementations. An embodiment of a method for operating a ring network includes the steps of configuring the ring network with static configuration information and then deterministically exchanging operational data between a plurality of nodes on the ring network, while operating the ring network in accordance with the static configuration information.

In the context of this document, the term "vehicle communications" generally refers to communications inside vehicles, for networks internal to a single vehicle, and communications between devices inside a vehicle, as opposed to communications between vehicles. Note that the term vehicle communications includes reference to devices (also referred to in the field as nodes, end systems, and/or operator terminals) that can be physically outside the vehicle, but are still part of the vehicle's (internal communications) network, for example sensors and communications equipment mounted to the exterior of a vehicle. Although the term vehicle communications generally refers to communications inside a vehicle, the current invention can also be used for communications between two or more vehicles. For example by replacing a node and the associated two typically hard-wired connections to neighboring nodes with a physically separate node (or portion of a ring) using wireless communications to connect to the two neighboring, nodes. Similarly, the vehicle communications can be extended from a vehicle to a non-vehicle, such as a person having a node with wireless communication to the vehicle. Note that the current invention can be implemented in a variety of environments, including hut not limited to fixed (non-mobile) locations and ground vehicles. A preferred implementation is aircraft installations, which is used in this document for describing and clarifying embodiments of the invention.

In the context of this document, the term "data", for example in "aircraft data network" (ADN) should generally be interpreted broadly as referring to all communications over the network. In this context, data can include, but is not limited to transferring over the network information, command, control, and monitoring. The general use of the term data in this document will be obvious to one skilled in the art. In the context of this document, the terms "network", "communications", "data network", "communication network", "data communications network", and combinations thereof are used interchangeably, as is known in the field. Data is typically transmitted in frames, and references to (transmitting, receiving, and processing) data and frames are generally interchangeable in this document.

The requirement for high reliability networks in aircraft installations, that is higher reliability as compared to general commercial networks, is well known in the field. Discussion of high reliability ADNs can be found in publications such as publications of Aeronautical Radio Incorporated (ARINC), such as the ARINC 429, ARINC 629, ARINC Specification 664 Part 7, and IEEE 802.3 standards. A popular implementation of ARTNC Specification 664 Part 7 is Avionics Full-Duplex Switched Ethernet (AFDX™, a trademark of Air-Bus).

Referring to FIG. 1, a diagram of a conventional ADN star topology network, conventional ADNs are implemented as double-star topologies, with redundant hubs and redundant wiring to all nodes (devices on the network). The double-star topology is commonly referred to in the field simply as a "star topology" or "star network", where the use of redundant networks is assumed for applications such as ADN and is referred to similarly in this document, as will be obvious to one skilled in the art. This start topology requires at least two switches to provide redundancy. Switch A 100A and Switch B 100B are redundant hubs (switches) with redundant wiring (respectively 106A and 106B) to one or more nodes (102A, 102B, 102C, . . . 102X). Each node has redundant wiring, one set of wiring to each of the redundant switches. As noted above, nodes can also be referred to as "devices" and "end systems". Switch A 100A and switch B 100B are typically connected to one or more other networks, shown as examples in the current diagram as network A 104A and network B 104B. Depending on the application, networks A and B (104A, 104B) can be the same network or different networks.

Current research in the field is focused on improving the current star topologies. An example is the most recent ARTNC specification, specification number 664, part 7, which focuses on improving the conventional star topology for an Ethernet switched network. ARINC Specification 664 Part 7 is a profiled version of an IEEE 802.3 network per parts 1 & 2, which defines how commercial off-the-shelf (COTS) networking components can be used for aircraft data networks (ADN).

In contrast, to conventional star topology networks for ADNs, the current embodiment features the use of a ring network running an innovative communication management system. This method for managing communications on the network provides a deterministic and static network that can provide the high reliability and performance requirements of vehicle communications, while reducing the cost, weight, and complexity of conventional implementations.

Ring networks can be successfully deployed in many commercial environments, and can provide significant installation, operations, and maintenance for some applications. In the context of this document, the term "ring network" generally refers to a network has a ring architecture, or ring topology, as generally known in the field. Ring networks are also referred to simply as "rings". The same features of ring networks that are desired for commercial installations can be unacceptable points of failure and/or fail to provide the required reliability and performance needed for an ADN. Conventional ring networks are designed for dynamic operations. In the context of this document, the term "dynamic" generally refers to changes occurring during operation (of the network). Conventional ring networks feature:

1. dynamic addressing,
2. dynamic bandwidth allocation.
3. "heavy" protocols (such as ERP and STP) to dynamically map the network topology, manage, and prevent looping (where to drop packets and what ports to keep on/turn off),
4. packets being only sent in one direction (during normal operation), and
5. no bandwidth guarantee for services on the network.

As known in the field, and briefly described above, while the features of a conventional ring network may be desirable for some commercial applications, these same features of conventional ring networks make ring networks not only non-obvious for use in ADNs, but a topology that is avoided in the development of ADNs. Currently, there are no known ring ADNs based on Ethernet.

Ring networks are desirable due to the known benefits of dynamic operation of conventional ring networks. Conventional thought is to avoid ring networks for static operations, as the same features of ring networks that are desired for commercial installations can be unacceptable points of failure for an ADN. Thus, conventional thought teaches away from embodiments of the current invention, as can be seen in government, industry, and academia approaches to implementation of static and deterministic networks. Specifically, conventional thought for implementing Ethernet-based aviation networks is to use a switched Ethernet topology to provide determinism for the network (databus).

The current embodiment uses a ring topology as the physical network architecture for connection of nodes, however, the conventional communication management systems that run on the ring are replaced and/or augmented, with a method for managing communications on the ring network provides a deterministic and static network using a distributed switch ring topology. This innovative method is referred to as DSR-NeT (deterministic static ring network).

In contrast to conventional ring networks, the current DSR-NeT features determination prior to operation of the network, of deterministic network parameters including, but not limited to specific connection topology of elements, configuration parameters for all network elements, maximum bandwidth of each service on the network, maximum latency, inter-frame gap, and jitter.

While operating a network deterministically can provide quality of service (QoS), implementing conventional QoS does not inherently provide deterministic operation. For example, the term QoS generally refers to maximum values, hence QoS is not predictable as to amounts and implementations, only to boundary conditions. In other words, while a deterministic network can be configured for transmission between two elements in a fixed amount of time [for example, 500 ns (nanoseconds) (plus or minus 10 ns)] a QoS implementation only specifies a maximum latency [for example, less than 550 ns]. QoS is insured when the DSRNeT is operational. As the network is deterministic, events like start-up time and handling time for failure of network components (nodes and/or wiring) are known, and broadcast storms can be prevented. Hence, the network can be configured to handle and/or prevent these events while providing the desired reliability and specific performance requirements of ADNs.

Preferably, every packet is sent in both directions. This innovative static and deterministic ring pre-defines all connections at system initialization, as required by the Federal Aviation Administration (FAA) and other regulatory bodies, facilitating the DSRNeT ring providing the high reliability and performance requirements necessary for vehicle communications networks. Thus, DSRNeT operates in accordance with FAA regulations. DSRNeT can be used as part of a vehicle, and in particular as part of an airplane.

In the case where Ethernet is used as the networking protocol, some conventional Ethernet networks are static, that is, parameters are not changing while the network is operational. Some static Ethernet networks can also be deterministic, that is, all network parameters are set and determined before the network is in use. Examples of network parameters include maximum bandwidth, latency, jitter, frame size, and inter frame gap. An example of a static and deterministic network is described in ARINC Specification 664 Part 7 (AFDX™). All conventional static and deterministic ADNs are star topologies. As described above, the features of conventional ring networks make using a ring network for an ADN not only non-obvious but a topology that is avoided in the development of ADNs. The current description of an innovative deterministic static ring network (DSRNeT) solves the problems of using conventional rings, including solving loop problems within the network by loop avoidance, as described below.

Figure 2:
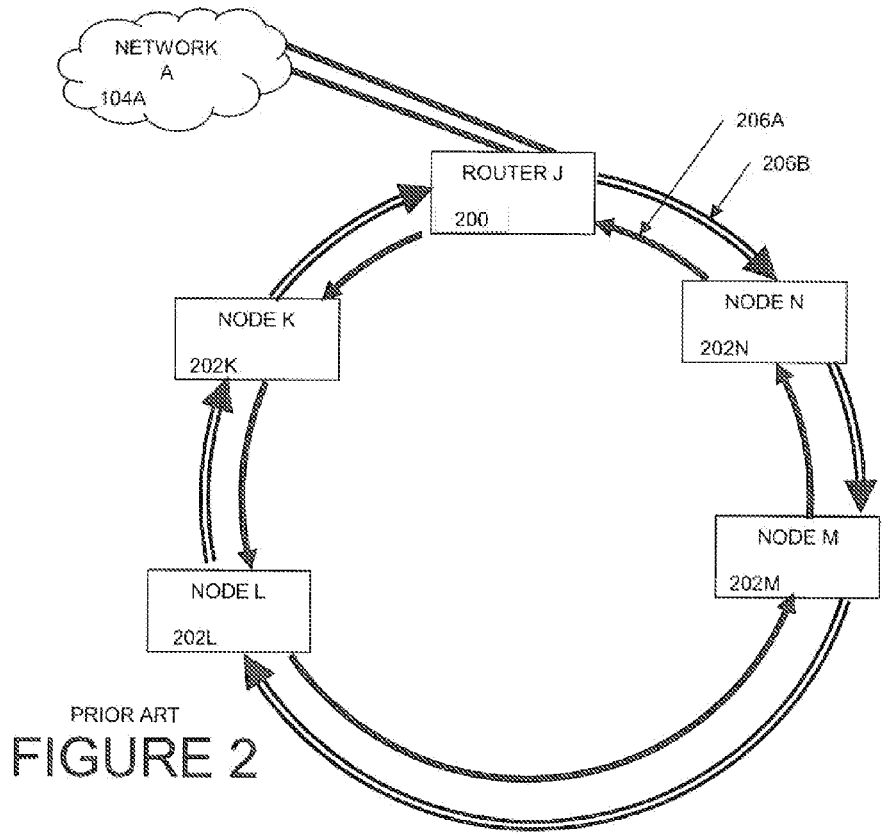
FIG. 2, a diagram of a conventional ring network

Referring to FIG. 2, a diagram of a conventional ring network, ring networks are a well-known network topology in which each node typically connects to two other nodes, forming a single continuous pathway for signals through each node. In other words, the signal path forms a "ring" through the nodes. Data travels from node to node, with each node along the way handling every packet. In the current figure, west ring 206A forms a path, or ring, from router J (200) to node K (202K) to node L (202L) to node M (202M) to node N (202N) to router J (200). Note that router J 200 is optional, and may be used instead of switch in a case where the ring network communicates with one or more other networks, such as network A 104A. In a case where a ring network only communicates between nodes on the ring network, network communication devices such as routers are not needed on the ring.

While ring networks can be implemented as a single or unidirectional ring, a preferred embodiment adds a "counter-rotating ring" to form a redundant topology, and is known as a "dual ring". Implementation and operation of conventional dual rings are well known in the field. In the current figure, east ring 206B forms a path, or ring, from router J (200) to node N (202N) to node M (202M) to node L (202L) to node K (202K) to router J (200). Note that as the network is a ring, the above descriptions of node connection could start with any element in the ring, not limited to router J (200) as described in the above non-limiting examples. Similarly, the terms "east" and "west" as applied to rings are arbitrary descriptors to assist in identifying to which ring is being referred. In the context of this document, references to embodiments as a ring, in the singular, should be understood as typically referring to dual ring implementations, as will be understood by one skilled in the art.

Router J 200 can connect to one or more other networks, shown as the non-limiting example in the current diagram as network A 104A.

Figure 3:
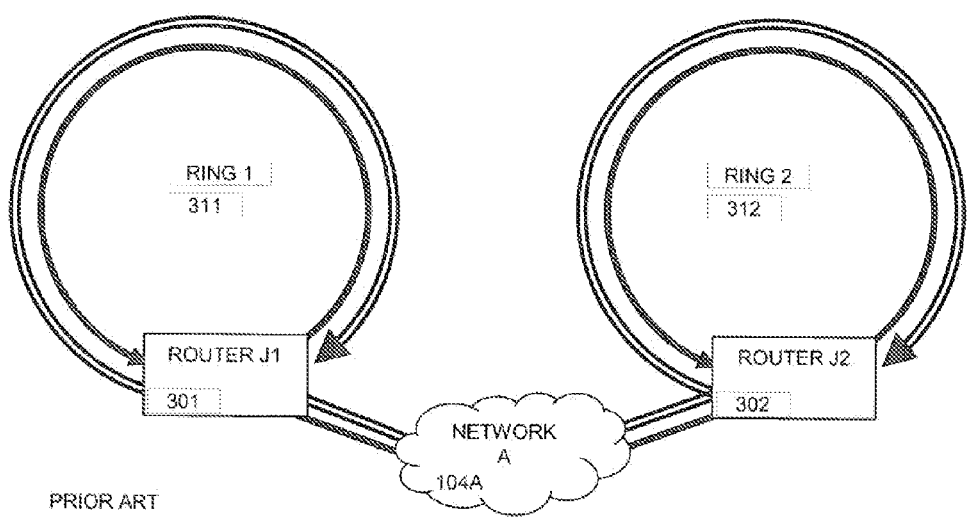
FIG. 3, a diagram of a multiple-ring network.

Referring to FIG. 3, a diagram of a multiple-ring network, nodes can connect to more than two other nodes, for example in a case of multiple ring topology in which two or more rings are connected via a common node. In this case, router J1 (301) connects ring 1 (311) to ring 2 (312) using router J2 (302) via network A (104A). In this case, the routers can alternatively be replaced by switches.

Figure 4:
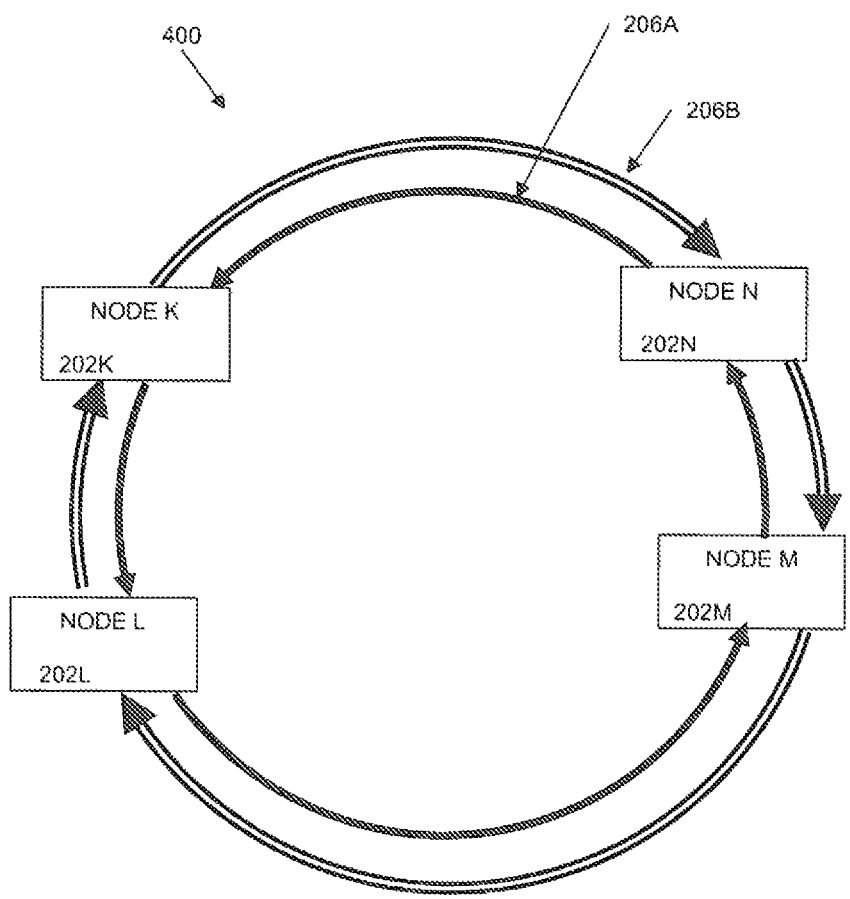
FIG. 4, a diagram of a DSRNeT ring network.

Referring to FIG. 4, a diagram of a DSRNeT ring network, the DSRNeT 400 does not require the use of a single central hub, as compared to conventional ring networks. Correspondingly, router or switch J 200 of the conventional ring network shown in FIG. 2 has been removed in the deterministic static ring network (DSRNeT) of FIG. 4. Similarly, DSRNeT does not require the conventional use of two central switches (for example, in FIG. 1 switch A 100A and switch B 100B). As the ring is static, connection between the nodes is done in each node—stand-alone routers, switches, hubs, and similar devices are not necessary for operation of DSRNeT. This feature provides redundancy while reducing the cost and weight of a DSRNeT ADN as compared to conventional dual switch and ring networks.

While the ring topology of the current embodiment of DSRNeT can be implemented as a single, or unidirectional ring, a preferred embodiment adds a "counter-rotating ring" to form a redundant topology, and is known as a "dual ring", as described above. Preferably, packets are sent in both directions on the DSRNeT ring 400. In other words, data is transmitted simultaneously in both directions (over west ring 206A and east ring 206B) on the ring network. Using the current figure, in a non-limiting example a packet from node N 202N is sent west from node N 202N on ring 206A and east on ring 206B toward the packet's destination node.

Similarly, the ring topology of the DSRNeT can be implemented in other ring configurations, such as in multiple- (multi-) ring topologies. Multi-ring topologies include, but are not limited to topologies such as two rings connected together, similar to die above-described configuration in reference to FIG. 3, and petal-ring configurations.

Each node (for example, 200, 202K, 202L, etc) on the ring can be the same or different type of equipment. Preferably, each node in the ring includes Ethernet interface with networking capability. Alternatively, nodes that do not include Ethernet (Ethernet network interface capabilities) can be connected to other nodes that have an Ethernet switch and access the network though the node having an Ethernet switch. Another option is a bus of nodes.

Adding nodes to a DSRNeT 400 requires smaller wiring changes and typically less additional wiring, as compared to adding notes to a traditional star (double star)-topology network. In a star network, adding a node requires adding two sets of wiring, one set to each of the dual switches. Note that this wiring must be installed to run from the location of the new node to the locations of each of the existing switches. In contrast, adding a node to a DSRNeT only requires changing the wiring connections from the new node to two of the nearest existing (previously installed) nodes. Installing a new node on a ring network requires either one or two sets of new wiring depending on if the old wiring between the existing nodes can be re-used). Typically, the new wiring for adding a node to a ring is significantly less (shorter runs) as compared to new wiring for a star network, as the new node is installed relatively closer to existing nodes in a ring network, as compared to the distance between a new node and each of the dual switches in a star network.

Redundancy in the DSRNeT is achieved at least in part by transmitting data in both direction of the ring at the same time. For example, data from node Ni 202M for node K 202K is sent from node M 202M on both the east ring 206B and on the west ring 206A toward node K 202K. In contrast, conventional ring networks typically transmit data in only one direction of the ring, and in the case of a network failure, begin to transmit data in the other direction around the ring. This switching of transmission direction on a typical ring takes time as compared to the data being immediately available to nodes on a DSRNeT due to the dual (direction) transmission.

Management overhead of a DSRNeT is reduced as compared to a conventional ring network, as all nodes on the DSRNeT are connected with point-to-point switch connections, as compared to the need for token management for the bus connection of a conventional ring network. Compared with conventional ring topologies, no dynamic negotiations are needed on a DSRNeT, QoS is predetermined, a spanning tree is not needed, and MAC and IP addressing resolution is not needed In general, DSRNeT can be described as a method for operating a ring network, the method including the steps of configuring the ring network with static configuration information and then deterministically exchanging operational data between a plurality of nodes on the ring network, while operating the ring network in accordance with the static configuration information. In the context of this document, the term "static configuration information" generally refers to all parameters of a ring network that need to remain fixed during operation of the ring network. In other words, static refers to remaining constant while operating the ring network. Statically configured communication networks enable reliable data transmission in real time. Static configuration information can include, but is not limited to specific connection topology of elements, configuration parameters for all network elements, maximum bandwidth of each service on the network, maximum latency, inter-frame gap, jitter, and other quality of service (QoS) parameters.

In the context of this document, the phrases "operating the ring network" and "the ring network being operational", "the ring operating", "operational", "operations", "network operational", and similar combinations generally refer to exchanging operational data between nodes on the ring network. In contrast, deploying and communicating data over the network for configuration of the network is not considered operation or exchange of operational information, but rather the configuration (configuration phase) and exchange of configuration data on a network prior to operating the network for the intended application for which the network is intended to be used. Operating the ring network refers to exchanging operational data on the network, as opposed to simply "powering-up" the network, during which time exchange of configuration information can take place. As is known in the field of computers and communications, often configuration of a network will occur after the network nodes have been powered up, but before the network is used to provide the intended services that will run on the network. One skilled in the art will understand that configuring the network before operations includes configuring the network after the devices have been turned on, and network configuration is separate from network operations.

The use of static configuration information facilitates a static, deterministic ring network wherein operational data is deterministically exchanged between the nodes while operating the static deterministic ring network in accordance with static configuration information. The exchange of operational data is deterministic. In the context of this document, the term "deterministic network" refers to a network providing guaranteed bandwidth and quality of service (QoS) to the nodes and/or services running on the nodes of the network. A deterministic system is a system in which no randomness is involved in the development of future states of the system. A deterministic model will thus always produce the same output from a given starting condition or initial state. "Deterministic" describes a system whose time evolution can be predicted exactly. In the case of the DSRNeT, "deterministic" includes determining and setting all network parameters prior to operation (use) of the network. Examples of network parameters include, but are not limited to the maximum bandwidth, maximal latency, maximal jitter, maximal and minimal size of frames, and maximal and minimal inter frame gap. In addition, the startup time of the network is deterministic because the start up time is not dependent on dynamic networking management protocols.

Note that while static refers to remaining fixed during operations, the network in general, including but not limited to nodes, software, firmware, and configurations, can be changed while the network is not operational. For example, during operations, nodes are not allowed to be dynamically added to the network. However, when the network is non-operational, for example during deployment and configuration, units can be added and removed from the network. In this case, the network typically needs to be re-simulated to determine the static configuration information for the new network configuration, and the nodes on the network re-loaded with the new configurations information corresponding to the new network configuration, after which the network can go operational.

As the DSRNeT is a deterministic static ring network, the desired operation of the network can be determined prior to operation of the network, and the static configuration information generated to insure that the DSRNeT will provide guaranteed operation of the services running on the network. Operation of the services on the network includes each of the nodes using the static configuration information to limit, manage, or regulate operation of one or more services running on the nodes. Services may be managed to limit the bandwidth used by a specific service, thus guaranteeing the bandwidth available to all the services running on the network. Similarly, managing each service's use of network resources guarantees the quality of service (QoS) for the services. At least a portion of the static configuration information is for guaranteeing quality of service (QoS) on the ring network.

The static configuration information can be generated by simulating offline the networking requirements of the ring network. Thus, the static configuration information is determined prior to operation of the network. Both determining/providing static configuration information and configuration of the network with the static configuration information can be done either before the network is deployed, after the network is deployed, or in combination, but prior to operation of the network, that is using the network operationally.

Typically, the static configuration information includes operating parameters for each of the nodes and at least a portion of the static configuration information is stored on each of the nodes. Optionally, the static configuration information is defined in one or more configuration tables. In this case, preferably, the static configuration information is defined in one configuration table for each of the nodes. Optionally, the static configuration information includes a description of a path for the operational data to be exchanged between the nodes. In other words, how the traffic should be managed between nodes, such as to which node data should be sent from the current node to reach a particular destination node. Optionally, the static configuration information includes a desorption of a path for operational data to be exchanged between nodes (devices) and if the ring network is a multiple-ring network, the static configuration information further includes a description of a path for the operational data to be exchanged between rings.

Static configuration information can be provided as one or more files or other data structures from one or more sources. Each file or data structure can provide all or a portion of the configuration information, and can be used to configure the ring network prior to operating the network (in other words, loaded onto the network prior to operations). All or a portion of the static configuration information can be loaded onto ail or some portions of the network before or after deployment Of the network. Configuration information can be loaded onto the network as a single set of configuration information or as multiple portions, at one time or different times to each of the nodes on the ring network. As is known in the art, and mentioned above, exchange of configuration information among the nodes is considered a configuration phase, or state, of the network, in contrast to the operational phase, or state, in which the static configuration information remains constant, and operational data is exchanged between nodes.

Each of the nodes is configured to inhibit changes during operation of the network to the static configuration information. Typically a portion of the static configuration information is stored on each of the nodes as operating parameters for that node. Each node is configured to inhibit changes to the static configuration information (typically to the portion of the static configuration information stored on that node). Techniques for insuring information does not change are known in the art, and include, but are not limited to techniques such as storing the information in a read only memory (ROM), storing the information in a memory area of the node that is regulated to allow only reading of that area, using "gatekeeper", "watch dog", and other monitoring modules to prevent processes on the node from making changes to data this is designated as read only.

Note that as will be obvious to one skilled in the art, there may be other configuration information that does change during operation of the network. Examples of cither configuration information include configurations unrelated to the operational exchange of data, related to internal settings of each node, and/or unrelated/not affecting network communications.

A significant feature of the DSRNeT is that exchanging operational data includes transmitting simultaneously the operational data in both directions on the ring network. In other words, exchanging operational data includes transmitting simultaneously the operational data between the nodes in two opposite directions. The known problems of LOOP transmission and BROADCAST storms in conventional ring networks is solved in DSRNeT at least in part through use of the static configuration information. A routing loop, simply referred to in the field as a "loop", or "loop transmission" is a networking problem in which data (packets) continues to be forwarded repeatedly between nodes, without reaching the intended destination of the data. A broadcast storm, as is generally known in the field, is the result of an incorrect broadcast on a network that causes multiple hosts to respond by broadcasting themselves, causing multiple hosts to respond again, thereby exponentially increasing the amount of traffic on the network.

The deterministic operation of the network, including use of techniques such as static configuration information, facilitates implementation of "loop avoidance". One method for loop avoidance and managing transmission on the ring includes terminating the exchange of the operational data at or before the operational data is exchanged with the node that originated the operational data. In other words, the exchanging of operational data is terminated at or before the operational data is received by one of the nodes that originated the operational data. Another method is termination of exchange of the operational data by a node if the operational data is associated with that node's address on the ring network. Another embodiment includes each node holding a pre-defined and static table. The table holds addresses to be discarded once received by each port. An example for an efficient and relatively simple way to avoid network loops is to configure the table to discard frames originated by the same node (but from a port other than the port at which the frame was received).

Another embodiment for loop avoidance and managing transmission on the ring includes configuring at least one of the nodes (devices) on the network to terminate exchange of at least a portion of operational data received from a first direction if the node previously received the portion from an other direction. Preferably, all of the nodes on the ring have this configuration. Typically, the portion of operational data is one or more packets received at a first port of the node from the first direction (for example, East), where the packets have already been received at a second (other) port of the node from an other direction (for example, West). In other words, a node in the ring will drop duplicated packets coming from the other side of the ring. For example, if a node already forwarded a packet from East-to West, and now a similar packet comes from West-to-East, this similar, duplicated, packet will be dropped by the node. This technique, can reduce bandwidth used in the ring by 50%, as compared to conventional implementations.

As described above, DSRNeT can be implemented in a variety of ring configurations, such as in multi-ring (multiple-ring) topologies. Based on the above description, one skilled in the art will be able to implement the above-described methods for loop avoidance and managing transmission on the ring to multiple-ring networks.

Loop avoidance can be implemented in end-systems using a variety of techniques, including, but not limited to:
1. Configuring an internal switch of the end-system. This can be done using a configuration file. The configuration file can be either "hard coded" into the software or loaded from another location on the network and configured to non-volatile media in the system (such as a flash device). The configuration file can then be used to configure a networking device such as a field programmable gate array (FPGA) or switch component to discard the frames per port. In another implementation, (for example when not using an FPGA), the same technique can be implemented with software discarding frames based on the configuration file.
2. Using (adding) software to each end-system that checks the Medium Access Control (MAC) source address of each frame of data being exchanged and not re-transmitting received frames containing the MAC source address of that end-system, or using software with similar methods, and
3. Adding additional hardware or software, for example an FPGA, to implement a rate management policy—that is, not allowing the bandwidth to go above a threshold and making sure each network element is transmitting at the correct time.

Implementation of the DSRNeT is possible in some cases with relatively small changes to existing end-systems in deployed ADNs. In a case where the nodes (end-systems) are AFDX™ compliant systems, the behavior or the nodes are already defined for operation on a static, deterministic network—the AFDX™ double-star topology network. AFDX™ compliant end-systems can be used to build the DSRNeT deterministic static ring topology network. Changes to the end-systems include adding features to implement the above-described DSRNeT method for managing communications on a ring network. In particular, adding features for loop avoidance and guaranteeing QoS on the ring network. As AFDX™ compliant end-systems do not include Ethernet switches, there is also a need to add a small switch for each DSRNeT node, as described above.

Figure 10:
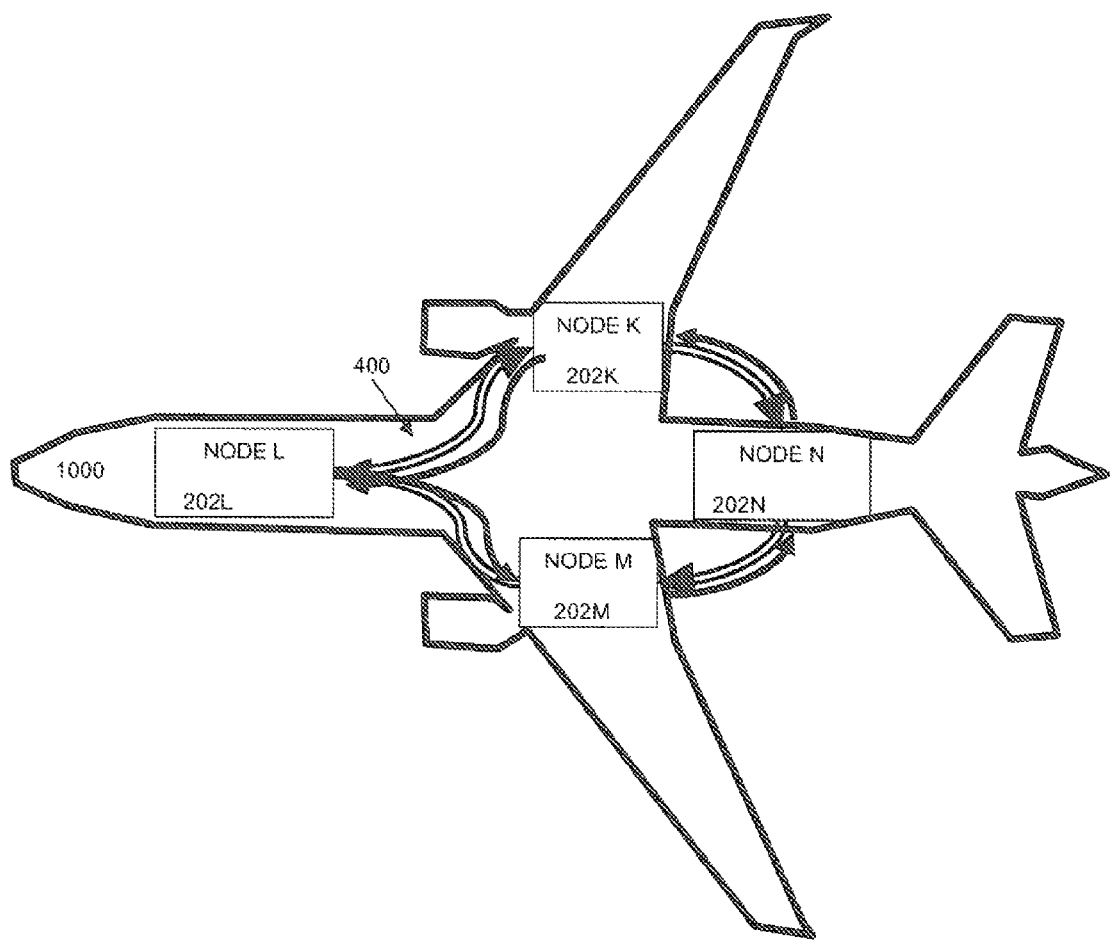
FIG. 10, a sketch of an airplane including DSRNeT.

Referring to FIG. 10, a sketch of an airplane including DSRNeT, as described above DSRNeT 400 can be used as part of a vehicle, and in particular as part of an airplane 1000.

Optional Embodiments—FIGS. 5-9

The following optional embodiments can be used with the above-described DSRNeT, or implemented as parts of conventional systems, alone or in combination.

Legacy Bus Translation

In many environments, and particularly in aircraft installations, there are legacy control busses and/or legacy equipment that need dedicated wire connections for communication with other devices. Also, there is equipment that may need to communicate with other equipment having different control bus interfaces. Different busses include, but are not limited to ARINC 429, MIL-STD-1553, CAN, RS-232, and RS-485. Bus physical interfaces can be optical or electrical.

A non-limiting example is a case where avionic computer A with interface A (for example, CanBus) needs to communicate with avionic computer B with interface B (for example, MIL 1553). Currently, legacy devices communicate using dedicated protocol conversion on one or more of the avionics computers with dedicated wiring between the devices. For example, a radio control box in a cockpit that enables frequency and other parameters to be set for a radio in the aviation equipment room. In this case, a dedicated bus is wired from cockpit to aviation equipment room over which the two devices communicate. Conversion of protocols is from one bus protocol specific to an equipment to another bus protocol specific to another equipment.

Currently, changing or adding equipment necessitates a change in aircraft design and implementation of different wiring, Which requires new certification of the aircraft.

Figure 5:
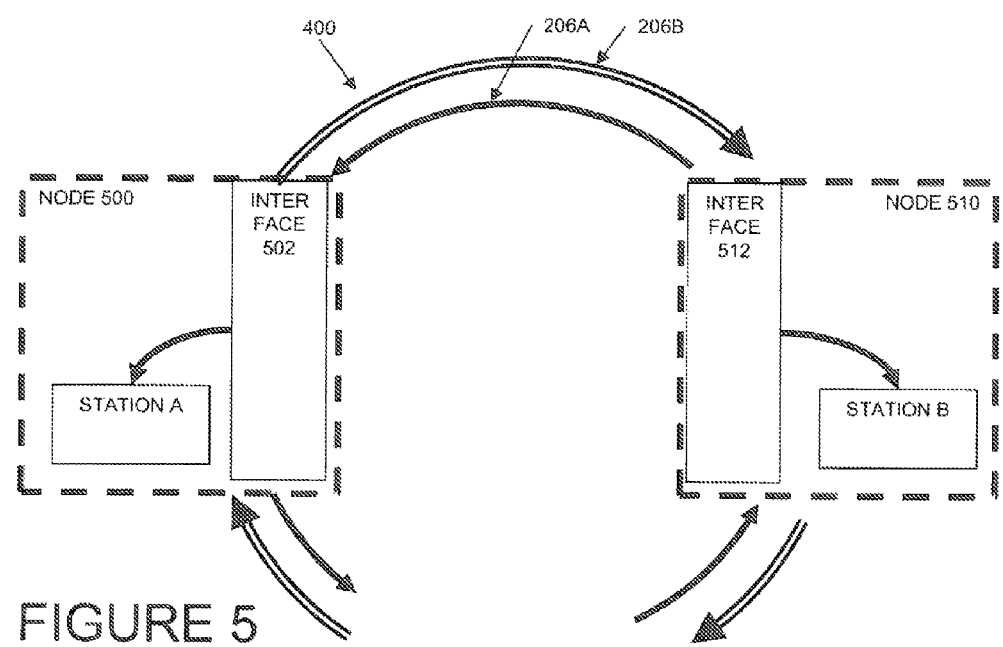
FIG. 5, a diagram of a system for managing legacy control buses used by legacy devices.

Referring to FIG. 5, a diagram of a system for managing legacy control buses used by legacy devices, legacy station A needs to communicate with legacy stations B. Instead of conventional dedicated wiring, a general-purpose network is used, for example Ethernet or preferably the DSRNeT (206A, 206B). Station A is at node 500 and station B is on node 510 of the general-purpose network. Each node contains an interface to translate between the communication protocol of the legacy device, in this case interface modules 502 and 503 for station A and B, respectively. Using the above example with avionic computer A (communicating via CanBus) as station A, interface module 502 translates between Canals and Ethernet. Communications from interface module 502 are sent from node 500 via DSRNeT to node 510 where interface module 512 translates the communications from Ethernet to MIL 1553 and then to avionic computer B in this case station B.

This system for managing legacy communications allows connecting different equipment types together through art existing general-purpose network, preferably a DSRNeT Ethernet network. An interface module contains at least two interfaces, typically a first interface is a legacy or specific purpose communications protocol and a second interface is a general or open standard communications protocol, preferably, but not limited to Ethernet.

On the legacy bus receive side of the interface module, data received from a legacy interface bus is put in memory; the data is then encapsulated as the payload of a frame on the general-purpose network, such as in an Ethernet frame. In this case, the Ethernet frame is sent to the general-purpose Ethernet network and is forwarded to a destination, node by the Ethernet or higher-level protocol address. On legacy bus transmit side of the interface module, the original legacy bus data is extracted from the received. Ethernet frames, and is moved to memory. From memory, the legacy data is transmitted to a selected legacy bus interface, controlled for example by looking at a configuration table. In a case where a first legacy interface needs to transfer clocking and other signals in order to synchronize with a second legacy interface, the clocking, and other signals can be emulated by the general-purpose network.

This system features easier adjustments, equipment upgrades, and enablement of interoperability between legacy control busses and/or legacy equipment, as compared to conventional systems and methods. This system is especially applicable to aircraft installations, but can be implemented in other environments.

Management of Network Traffic

As described above, in conventional solutions in many environments, and particularly in aircraft installations, there are legacy control busses and/or legacy equipment that need dedicated wire connections and/or dedicated interfaces to allow for communication with other devices having different control bus interfaces. Conversion of protocols is from one bus protocol specific to an equipment to another bus protocol specific to another equipment. Currently, changing or adding equipment necessitates a change in aircraft design and implementation of different wiring and/or interfaces, which can require new certification of the aircraft.

Referring again to FIG. 5, a non-limiting example of a system for management of network traffic has an exemplary sensor (station A) at node 500. The sensor has a legacy MIL-STD-1553 interface that is connected to the network via the above-described interface 502. Messages from the sensor are received by another node on the network, for example node 510 for a management module running on an exemplary computer represented by station B. As described above, if the messages need to be converted, interface 512 can convert the messages to a format suitable for the management module (station B). The management module parses the messages coming from the sensor. The messages act as input to trigger application, functions and other actions on applications and devices that the networking is running. For example, an output of the management module could be an alarm signal trigger to one or more applications and/or devices, turning a siren on logging, initiating an audio announcement, etc.

This system for a management module is generally used with a terminal connected to an external legacy device by a legacy bus. The terminal receives data from the legacy device via the legacy bus, extracts the relevant data from the legacy bus message, stores the relevant data in a local memory associated with the terminal. The terminal sends the relevant data in a message via a general-purpose network to another node on the network. At the other node, a management module processes the message and based on the relevant data and a set of local rules, generates triggers. Triggers can be local, or sent over the general-purpose network to other network nodes. Triggers can be used to run algorithms, initiate actions, generate further triggers, or run additional rules.

This system features use of a management module to analyze network traffic and use the network traffic as input to trigger application functions and other actions. In contrast to conventional solutions, relatively smaller aircraft without mission computers can use this system to run applications, the applications can react to network events, and there is the ability to implement priority and other logic for application functions.

Ring Distribution of Power

In conventional solutions for unmanaged power distribution, power connection of equipment is done by bus connection, where a cut or break in a power distribution wire causes a power failure to equipment connected to the bus.

Figure 6:
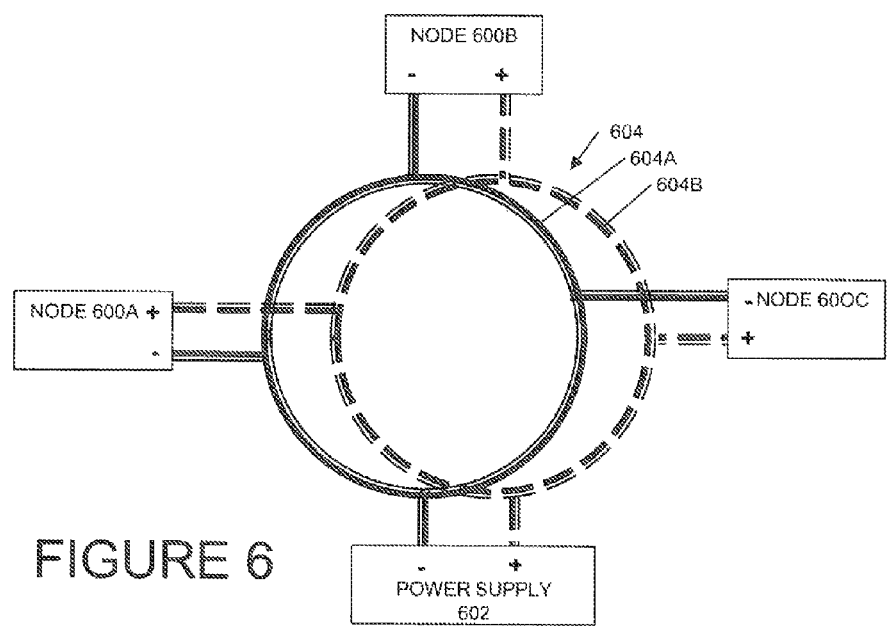
FIG. 6, a diagram of a system for redundant power distribution in a ring topology.

Referring to FIG. 6, a diagram of a system for redundant power distribution in a ring topology, power supply 602 outputs power on positive (+) and negative (−) terminals. The output power is distributed via a dual ring 604, including a positive ring 604B and negative ring 604A for distribution respectively from me positive (+) and negative (−) terminals of the power supply to the positive (+) and negative (−) input terminals of nodes (examples 600A, 600b, 600c) connected to the dual-ring 604. All nodes on the network require the same DC voltage level. The nodes (network-elements) are unaware of the power distribution topology.

This system for redundant power distribution in a ring topology is typically used for unmanaged power distribution. In a case where the power is being distributed for a ring network, a wired harness can be used for installation (running) the power distribution wires, preferably the same harness as is used to hold the network wiring. In one implementation, a cable bundle can be prepared, without changes to the nodes (terminals to receive power), and the cable bundle can then be deployed in a ring topology network. The power distribution (supply) cables should be short-circuited (positive (+) to positive (+) and negative (−) to negative (−)) at the edges of the ring.

A preferred implementation of this system is with the DSRNeT. This system allows connecting equipment to two power sources using a RING topology. The ring topology for Ethernet nodes allows routing of each power line to each terminal in the ring connection, such that in the event of a disconnection or break of a line (one of the power distribution wires), this system allows continued power supply to all units.

This system features redundancy of power routing, particularly in conjunction with redundancy of communication lines.

Dual Use Networking Line

Conventional solutions for providing backup audio connections in the case of power failure typically use dedicated wiring between stations. In failure mode, the dedicated wiring between nodes (also referred to as stations or terminals) provides for connection of an audio capability, such as a headset at a first terminal, to another terminal (such as an operator in a remote location).

Figure 7:
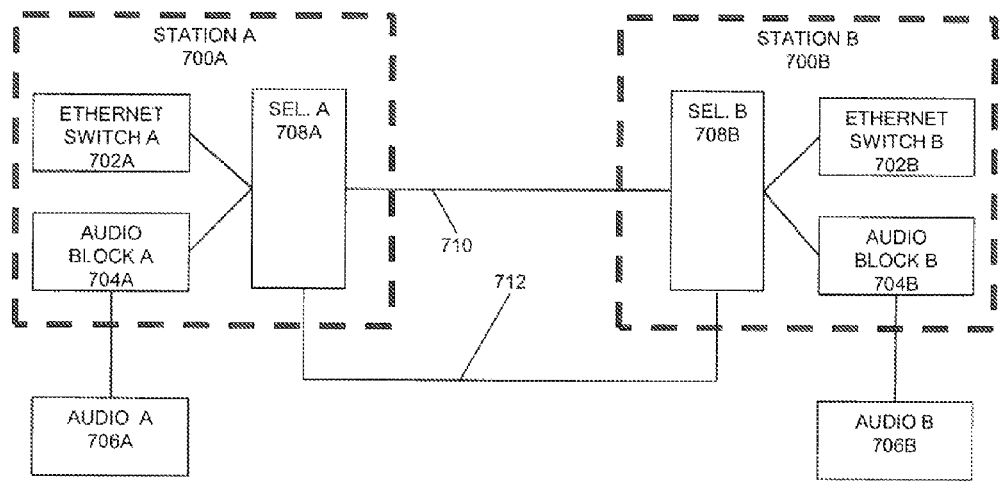
FIG. 7, a diagram of a system for analog backup during network failure using existing network wiring.

Referring to FIG. 7, a diagram of a system for analog backup during network failure using existing network wiring, station A 700A and station B 700B are two exemplary nodes on a network. Station A/B respectively each has a network communications switch, such as exemplary Ethernet switch 702A/B, audio block 704A/B, and audio 706A/B (source, input/output). During normal operations, network communications, such as Ethernet communications, use network electrical lines 710 for network communications between station A 700A and station B 700B. Audio communications are typically carried digitally between the stations (not shown), via a variety of methods commonly known in the art, including, but not limited to VoIP and PCM communications. Digital communication of the audio signals typically uses the digital network communications, such as the Ethernet communications (not shown). During network failure, including power failure, typically dedicated wiring is used between stations to provide analog backup for audio communications (not shown).

This system for analog backup during network failure uses existing network wiring, in contrast to conventional systems that use dedicated wiring. Dual use of existing network wiring, such as Ethernet connection lines for analog backup during network failure is enabled at least in part by adding a selector to two or more nodes on the network. In the current figure, selector A 708A is added to station A 700A. Selector A 708A is connected to both Ethernet switch A 702A and audio block A 704A for selection of one of the connections. Selector A 708A connects from station A 700A to station B 700B via electrical lines 710. Similar to the connections of selector A 708A, selector B 708B has connections to both Ethernet switch B 7028 and audio block B 704B for selection of one of the connections. During normal operations, the selectors 708A/B connect the Ethernet switches 702A/B via electrical lines 710 for digital network communications, possibly including digital connection of the audio as described above.

During a power failure, the Ethernet switches 702A/B can no longer use electrical line(s) 710. As both the ports of the Ethernet switches 702A/B and the audio lines (via audio blocks 704A/B) are connected (within the station) to a selector, the electrical lines 710 can be used during a power failure to carry an analog audio signal, or in general signals other than the original signal (in the current example, Ethernet). Preferably, the selectors 708A/B are passive, for example mechanical selectors. The selectors 708A/B can be configured such that while power is supplied to the selectors 708A/B, the selectors 708A/B provide digital network connectivity between the Ethernet switches 702A/B. Upon power failure, the selectors 708A/B are configured to provide analog connectivity between the audio blocks 704A/B. Alternatively, analog connectivity can be provided between audio 706A/B.

Optionally, a signaling line 712 can be provided between the selectors 708A/B. This signaling line 712 can optionally be used to indicate the use of the lines. For example, a high signal ("1") indicates to the selectors 708A/B to provide Ethernet connectivity, and a low signal ("0") indicates the selectors should provide audio/analog connectivity. As is known in the art, to achieve a low signal ("0") level while power is down, pull-down resistor(s) can be used. In another alternative embodiment, electrical lines 710 can be analog lines plus power to drive the audio analog during normal operations. Preferably, electrical lines 710 and signaling line 712 are deployed in a single wiring harness.

This system features use of existing electrical network wiring during failure mode without the need for dedicated wiring between nodes. Digital and analog connections between two or more nodes are connected via the use of passive or activated selectors at one or more nodes on the network, in particular, providing an analog headset backup connection.

Backup Power Supply

In conventional solutions, bias voltage is supplied by a radio to activate microphone circuits when normal power is not available due to failure. This method does not work with military (dynamic) headsets, as military headsets do not operate with DC bias, instead needing an active amplifier to work. This requires a working power supply to supply power to the military headset. In addition, the conventional bias voltage solution may not be available for all radio types, as not all radio connections supply a DC current, so during a power failure the conventional solutions fail.

Figure 8:
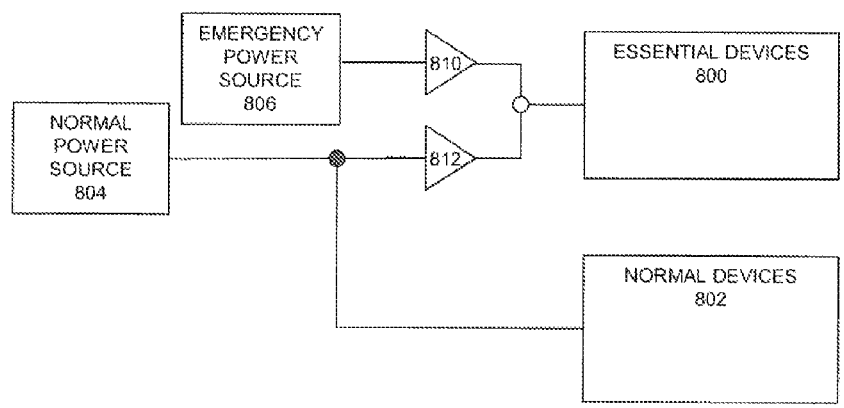
FIG. 8, a diagram of a system for supplying power to a headset interface.

Referring to FIG. 8, a diagram of a system for supplying power to a headset interface, a normal power source 804 is used during normal operations to supply power to all devices. A feature of this system is the separation of devices into normal devices 802 and essential devices 800. During normal operations, normal power source 804 is used to supply power to normal devices 802 and essential devices 800. During a power failure (also known as during failure mode, when the normal power source 804 is not supplying power), power is supplied by the emergency power source 806 to the essential devices 800. The power supply for the essential devices, such as emergency headset interface circuits or other essential emergency functions is isolated by diodes, so in case of a power failure only the essential circuits should be powered by back-up power supply.

The diodes are connected in series from the emergency power source 806 to the normal devices 802. A first diode 810 is connected between the emergency power source 806 and the essential devices 800. A second diode 812 is connected between the normal power source 804 and the essential devices 800. During normal operations, second diode 812 allows power from the normal power source 804 to power the essential devices 800, while first diode 810 isolates the emergency power source 806. During failure mode, first diode 810 allows power from the emergency power source 806 to power the essential devices 800, while second diode 812 isolates the power from the emergency power source 806 from powering the normal devices 802. In other words, once the normal power supply 804 fails, or goes to ground, there will be isolation between the normal power supply 804 and essential devices 800 due to the diodes (810, 812). This configuration enables the emergency power source 806 to drive only the essential devices 800 Note that the essential devices 800 can include portions of devices, such as essential circuits.

Back-up power supply can be implemented from an emergency power source 806 by a variety of methods, depending on the specifics of the application. Implementations include, but are not limited to:
  An on-board power supply that is totally independent from the normal power supply, and used to supply power to the essential emergency functions.
  A power supply from another terminal, such as where power is supplied through dedicated wires to a failed unit.

This system for supplying power to a headset interface is typically used for supplying drive power to a headset interface through a back-up connection from a working terminal to a terminal with power failure to allow for emergency operation of the headset. This system allows a failed node to receive power for emergency headset interface circuits from an alternative power supply. Alternative power supply can come from an embedded redundant emergency power supply or from an alternative node through dedicated wiring.

This system features an interface compatible with military headsets and enables switching of audio signals using an electrical circuit rather than electromechanical relays. Emergency power supply allows headset interface to radio, alert, or other devices in case of node failure. The emergency power can be supplied externally or be redundant as part of node circuits.

Attaching and Detaching AFDX™ End-Systems from a Virtual Link

In conventional solutions virtual links (VLs) in an AFDX™ network are configured offline, as the network is required to be deterministic. The number of VLs in the network is proportional to the number of end-systems (ESs). The more VLs, the more network resources the network needs to reserve for handling the VLs. Each VL defines a single ES transmitting to one or more ESs.

This system for attaching and detaching AFDX™ ESs from a virtual link uses a pre-defined control message between every ES, allowing the "joining" and "leaving" of ES from a listening state for a given VL. Prior to an ES transmitting, the ES sends a control message to all the other ESs on the network. The control message describes at least in part: Which other ESs are requested to listen to the subsequent transmit message, which ESs should forward the transmitting frames, and which ESs should block the frames from further transmission. Using this pre-defined control message results in a smaller number of VLs being used on the network, as compared with conventional solutions.

In general, a method for attaching and detaching AFDX™ ESs from a virtual link begins with a network integrator defining a "well-known" control-VL (for example, a multicast destination address) of which all the ESs on the network are members (that is, setting the learning MAC address of the switch to forward messages to the ES). This control-VL will be used to send messages between the ESs over the network.

In a non-limiting example, an ES is about to start streaming data. The ES sends over the control-VL a message including the following information: Description of the stream of data, which ESs should listen, which ESs forward the frames, which ESs discard/block the frames, etc. Other information that can be part of a message includes, but is not limited to: Stop listening to stream, errors counter pass threshold, and user took an action (for example, the user pressed a panel button). The types of information in the messages and the format of the messages should be known to all the ESs. The messages can be proprietary, or use an existing protocol.

This system features the use of a reduced number of VLs on an AFDX network by using control messages between the ES, as compared to the number of VLs needed for conventional AFDX network implementations. ESs need to support a smaller number of VLs and less resources are needed on each ES, as compared to conventional implementations.

Isolating Defective Network Elements

In conventional solutions, a rate limit per virtual link (VL) is defined for receiving frames with errors. When the rate limit is exceeded, received frames will be discarded and relevant counters will be incremented, for example a counter of how many times the rate limit has been exceeded for a given VL The defective node that is transmitting the errored frames will continue transmitting frames with errors until the defective node is repaired.

Referring again to FIG. 4, a non-limiting example of a system for isolation of defective nodes on a network includes node K 202K that is transmitting to node L 202L. Node K has a hardware failure in an output Ethernet port, and is sending defective packets over west ring 206A to node L. A preferred implementation of this network is the DSRNeT. This system can also be used with an AFDX™ network. Frames received by node L are checked, for example by checking the CRC of the received frame to see if the frame is good or if the frame has an error. Each frame that has an error is dropped (not forwarded further). An error counter for the port corresponding to the errored frame is incremented. Receiving of an errored frame from node K can indicate that node K the transmitting node) generated the frame with an error, or forwarded a frame with an error. In either case, receipt of an errored frame indicates that node K (the transmitting node) is malfunctioning.

Each node can poll the Ethernet ports and read the corresponding error counters for that port. When the error counter for a port reaches a given threshold, node L (the receiving node) closes the corresponding Ethernet port. Alternatively, for each port, the node can read the number of frame errors received by the port since the previous read. By calculating the number of frame errors for a time interval, the receiving node can calculate the error rate of frames. If the error rate meets or exceeds a given threshold, the receiving node (node L) closes the corresponding Ethernet port. Alternatively, if the error rate exceeds a given threshold for a given length of time the receiving node can trigger that the corresponding Ethernet port should be closed. By closing the Ethernet port corresponding to the defective node (in this example node K), the receiving node (in this example node L) no longer needs to use resources to monitor, receive, and process transmissions from the defective node.

This system features isolation of defective nodes on a network, reducing the resources required by receiving nodes that no longer have to process (and drop) transmissions from the defective node.

Centralized System Configuration

In conventional solutions for configuration of system elements in aviation and other secure industries, production procedures require that a change in system configuration or element (also referred to as a unit or node) software or firmware be indicated by a change in unit part number or revision number. This change in number is to assure that the right software and firmware are installed in system elements operating in mission critical environments.

Typically, software and/or firmware are stored in a non-volatile RAM (NVRAM, such as the popular flash RAM) on the unit. For clarity in this description of a centralized system configuration, software and/or firmware is/are referred to simply as "software" or "SW/CONFIG". The stored software is unique for a specific unit part number and revision. As the unit boots, the unit loads the software from the NVRAM to operating RAM on the unit and initiates the software-application. Later, the software application reads a configuration and/or firmware file and uses the configuration file parameters and firmware to initialize hardware on the unit and begin operation of the unit.

When a unit holds the software and configuration file in the unit's NVRAM, deployment, upgrades, and system changes require efforts such as:

Each unit must be configured (burned) and marked for a specific project (deployment and/or system configuration).

Units cannot be switched with other units having the same hardware configuration and different software loads (configurations).

Specific engineering, testing, and production files and procedures are needed for each software configuration.

This system for centralized system configuration allows the software, firmware, and other configuration information to be stored in a centralized, configuration server. The configuration information is not part of node, allowing changing configuration of software without changing the node, but the configuration information is connected to a node so the configuration information is part of the network through that node. This configuration server includes a memory device that is installed as part of system installation. At system power up, the configuration server is contacted by each of the other units in the system, directly or through the network, and a centralized system configuration is read from the configuration server to verify that the configurations of each of the units are correct. In a case where configuration of a unit is correct (the configuration of the unit matches the downloaded configuration from the centralized system configurations on the configuration server), the unit will take no action. In a case where configuration of a unit is not correct (the configuration of the unit does not match the downloaded configuration from the centralized system configurations on the configuration server), the unit will be updated with the correct configuration information. For example, the correct configuration information matching the unit part number or revision number is downloaded from the configuration server to the unit and stored (burned) to the unit's embedded NVRAM. In a case where a unit cannot communicate with a configuration server, the unit will preferably give an error indication.

This method of centralized system configuration can be based on one of the node in the network acting as the centralized configuration server. This server stores the software and configuration files. The actual storage can be on an NVRAM memory device, including, but not limited to flash, PCMCIA, and disk on key.

Figure 9:
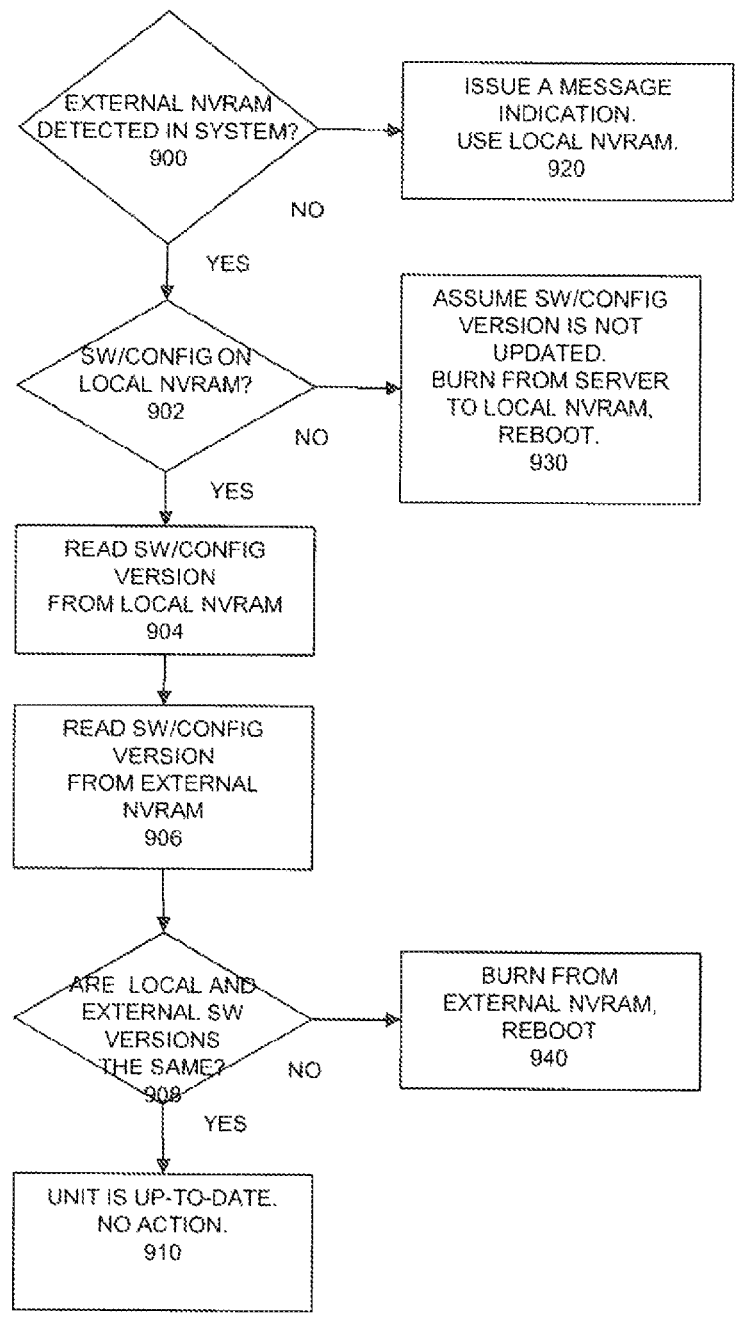
FIG. 9, a flowchart of a method for centralized system configuration.

Referring to FIG. 9, a flowchart of a method for centralized system configuration is shown. During power-up of the system units, the units will look for a configuration server and attempt to communicate with the server directly or through other units. In general, an algorithm for each unit in the system to use for boot and configuration can be:

a. A unit which detects an external NVRAM attached will act as follows (step 900):
  i. Read the local NVRAM to detect if software and/or configuration (SW/CONFIG) files are present on the local NVRAM (step 902).
    if SW/CONFIG files are present on the local NVRAM:
      read the SW/CONFIG part number and revision number from the local NVRAM (step 904),
      read the SW/CONFIG number and revision number from the external NVRAM (step 906),
      compare the local and external versions of the SW/CONFIG part numbers and revision numbers (step 908),
      if the versions are the same, the unit is up to date, and no further action needs to be taken (step 910),
      else if the versions are not the same, the unit burns SW/CONFIG files from the external NVRAM to local NVRAM, after which the unit reboots to enable operation with the correct versions (step 940).
    If SW/CONFIG files are not detected on the local NVRAM, the unit loads SW/CONFIG files from the server to local NVRAM after which the unit reboots to enable operation with the correct versions (step 930).
b. if none of the system units detects an external NVRAM, the units issue a message indication that there is no external NVRAM in the system, and each unit uses software from the local NVRAM (step 920).

In a preferred implementation, there is no pre-defined centralized configuration server in the network. Each end-system (unit) has a connector that can be used for attaching an (external) NVRAM. An NVRAM is attached (for example, by a network administrator prior to booting the system) to one of the units. Note that at each boot of the system, the NVRAM can be attached to a different unit, if desired. In other words, the NVRAM can be changed often. As described above, the NVRAM contains system configuration information, such as software and configuration files. On boot, a unit detects that an external NVRAM has been attached, and the unit runs a software and configuration server application, whereby the unit is now acting as a centralized configuration server, either as a single function of the unit, or possibly in conjunction with the regular functions of the unit. Other units detect this server through network or via other connections, and load software and configurations from this server, based on the procedure described above. In the case where a unit is a DSRNeT or AFDX™ end system, the capability of acting as a configuration server is an additional capability, in addition to the DSR-NeT or AFDX™ specification's requirements for the unit.

This method and system for centralized system configuration can enhance deploying and deployed networks, such as DSRNeT or AFDX™ networks, in that a new unit (end-system) without software and/or without a configuration can be added to the network without requiring the new unit to be pre-configured before joining the network. Alternatively, an old unit with an unknown software load and/or configuration can be added to the network. In this case, if the unit is configured for running the centralized system configuration capability, the unit will boot and receive the correct version of software and configuration for running on the network, without the need for analysis and loading of the old unit. In either case, the unit will download the appropriate software, firmware, and/or configuration information for operation in the system of which the unit is now part.

This system features centralized system configuration for elements of a system. Product part number and/or revision are independent from software and/or system configuration of each element. Elements can be shared between projects and networks that use the same hardware elements (even if the software running on the elements during system operation is different). Network installations are easier than conventional installations, as a central configuration server holds all installation information and software, thereby reducing or eliminating the need for configuration tools and technicians. In a case of software or configuration change, only the central configuration server needs to be changed.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

It should be noted that the above-described examples, numbers used, and exemplary calculations are to assist in the description of this embodiment. Inadvertent typographical and mathematical errors should not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method comprising the steps of:
    (a) configuring a ring network with static configuration information; and
    (b) exchanging operational data deterministically between a plurality of nodes on the ring network while operating the ring network in accordance with said static configuration information,
    wherein exchanging operational data deterministically includes guaranteeing a bandwidth, a latency, and jitter of each logical communication channel with traffic flow control,
    wherein at least a portion of said static configuration information is for guaranteeing quality of service (QoS) on the ring network, and
    wherein at least a portion of said static configuration information is stored on each of said nodes, and
    wherein at least one of said nodes is configured to terminate the exchange of a portion of said operational data received from a first direction if said node previously received said portion from an other direction.

2. The method of claim 1 further comprising the step of:
    (c) generating said static configuration information by simulating offline the networking requirements of the ring network.

3. The method of claim 1 wherein said exchanging operational data includes transmitting simultaneously said operational data between said nodes in two opposite directions.

4. The method of claim 1 wherein operating the ring network includes each of said nodes using said static configuration information to limit Operation of one or more services running on said nodes.

5. The method of claim 4 wherein limiting operation of one or more services includes a limitation selected from the group consisting of:
    (a) bandwidth available to said services; and
    (b) quality of service (QoS) for said services.

6. The method of claim 1 wherein operation of said ring network is in accordance with Federal Aviation Administration (FAA) regulations.

7. The method of claim 1 wherein said static configuration information includes operating parameters for each of said nodes.

8. The method of claim 1 wherein each of said nodes is configured to inhibit changes to said static configuration information while operating said ring network.

9. The method of claim 1 wherein the ring network is a multiple-ring network.

10. The method of claim 1 wherein a configuration server is contacted by each of said nodes to read a centralized system configuration.

11. A system comprising:
    (a) a static deterministic ring network including a plurality of devices operationally connected in a ring topology, wherein operational data is exchanged between said devices while operating said static deterministic ring network deterministically in accordance with static configuration information,
    wherein operating deterministically includes guaranteeing a bandwidth, a latency, and jitter of each logical communication channel with traffic flow control,
    wherein at least a portion of said static configuration information is for guaranteeing quality of service (QoS) on said ring network, and
    wherein at least a portion of said static configuration information is stored on each of said devices, and
    wherein at least one of said devices is further configured to terminate the exchange of a portion of said operational data received from a first direction if said device previously received said portion from an other direction.

12. The system of claim 11 further comprising
    (b) one or more configuration tables for storing said static configuration information.

13. The system of claim 12 wherein each of said devices includes a configuration table defining said static configuration information for each of said devices.

14. The system of claim 11 wherein said static configuration information includes a description of a path for said operational data to be exchanged between said devices and if said ring network is a multiple-ring network said static configuration information further includes a description of a path for said operational data to be exchanged between rings.

15. A vehicle comprising said static deterministic ring network of claim 11.

16. The vehicle of claim 15 wherein said vehicle is an airplane.

17. The system of claim 11 wherein said static deterministic ring network includes two rings for simultaneous transmission of said operational data between said devices in two opposite directions.

18. The system of claim 11 wherein said plurality of devices communicates via said ring network according to a protocol selected from the group consisting of:
    (a) Ethernet protocol; and
    (b) IEEE802.3.

19. The system of claim 11 wherein said ring network is a multiple-ring network.

* * * * *